(12) United States Patent  (10) Patent No.: US 8,099,314 B2
Kagiwada et al.  (45) Date of Patent: Jan. 17, 2012

(54) COMMODITY CONTROL SYSTEM AND MEDIUM CONTAINING COMMODITY CONTROL DATA

(75) Inventors: Yoshimitsu Kagiwada, Kanagawa (JP); Motoaki Fujino, Tokyo (JP)

(73) Assignee: Keysoft, Inc., Kanagawa (JP)

( * ) Notice: Subject to any disclaimer, the term of this patent is extended or adjusted under 35 U.S.C. 154(b) by 1364 days.

(21) Appl. No.: 10/536,548

(22) PCT Filed: Nov. 29, 2002

(86) PCT No.: PCT/JP02/12551
§ 371 (c)(1),
(2), (4) Date: Feb. 21, 2006

(87) PCT Pub. No.: WO2004/051533
PCT Pub. Date: Jun. 17, 2004

(65) Prior Publication Data
US 2006/0173569 A1  Aug. 3, 2006

(51) Int. Cl.
*G06Q 10/00* (2006.01)
(52) U.S. Cl. .................. 705/7.29; 705/7.27; 705/36 R; 705/69
(58) Field of Classification Search ................. None
See application file for complete search history.

(56) References Cited

U.S. PATENT DOCUMENTS

| | | | | |
|---|---|---|---|---|
| 5,971,277 | A * | 10/1999 | Cragun et al. | 235/462.01 |
| 6,016,497 | A * | 1/2000 | Suver | 1/1 |
| 6,349,237 | B1 * | 2/2002 | Koren et al. | 700/96 |
| 6,625,581 | B1 * | 9/2003 | Perkowski | 705/27.1 |
| 7,130,807 | B1 * | 10/2006 | Mikurak | 705/7.25 |
| 2002/0069096 | A1 * | 6/2002 | Lindoerfer et al. | 705/7 |

(Continued)

FOREIGN PATENT DOCUMENTS

JP  1991-127260 A  5/1991

(Continued)

OTHER PUBLICATIONS

Operating manual for the QRS Keystone for Vendors (1996) by QRS Corporation, www.qrs.com, pp. 1-126.*

(Continued)

*Primary Examiner* — Lynda Jasmin
*Assistant Examiner* — Gurkanwaljit Singh
(74) *Attorney, Agent, or Firm* — Woodcock Washburn LLP

(57) ABSTRACT

The object of the present invention is to carry out commodity quality control among a plurality of enterprises, and control a proper commodity manufacturing process and distribution process. In order to achieve the objective, the present invention comprises information storage means (12), communication means (8) for communicating with an external device, and information processing means (14) for controlling the operation of each of the means. The storage means (12) stores for each of commodities identification information for identifying the commodity as well as client information of a client who has acquired the commodity. The processing means (14) comprises the steps of correlating the identification information for identifying the commodity with the client information of the client who has acquired the commodity to receive the correlated information from a client terminal through the communication means (8), collating the received identification information with the identification information stored in the storage means (12), specifying, when the received identification information has been matched with the identification information stored in the storage means (12) as a result of the collation, the commodity identified by the received identification information, and adding the received client information to the storage means (12) for each of the specified commodities.

11 Claims, 5 Drawing Sheets

U.S. PATENT DOCUMENTS

| | | | |
|---|---|---|---|
| 2002/0072956 A1* | 6/2002 | Willems et al. | 705/10 |
| 2002/0082735 A1* | 6/2002 | Wallace | 700/106 |
| 2002/0082959 A1* | 6/2002 | Barnard et al. | 705/29 |
| 2002/0087336 A1* | 7/2002 | Hale et al. | 705/1 |
| 2002/0120459 A1* | 8/2002 | Dick et al. | 705/1 |
| 2002/0128886 A1* | 9/2002 | Wang | 705/7 |
| 2002/0138316 A1* | 9/2002 | Katz et al. | 705/7 |
| 2002/0138320 A1* | 9/2002 | Robertson et al. | 705/8 |
| 2002/0194081 A1* | 12/2002 | Perkowski | 705/26 |
| 2002/0198791 A1* | 12/2002 | Perkowski | 705/26 |
| 2003/0009392 A1* | 1/2003 | Perkowski | 705/26 |
| 2003/0018516 A1* | 1/2003 | Ayala et al. | 705/10 |
| 2003/0061081 A1* | 3/2003 | Kellond et al. | 705/7 |
| 2003/0139975 A1* | 7/2003 | Perkowski | 705/26 |
| 2004/0103369 A1* | 5/2004 | Robertson et al. | 715/509 |
| 2004/0153378 A1* | 8/2004 | Perkowski | 705/27 |
| 2004/0210479 A1* | 10/2004 | Perkowski et al. | 705/14 |
| 2005/0004838 A1* | 1/2005 | Perkowski et al. | 705/14 |

FOREIGN PATENT DOCUMENTS

| | | |
|---|---|---|
| JP | 1992-287274 A | 10/1992 |
| JP | 11-110450 | 4/1999 |
| JP | 2001-100830 A | 4/2001 |
| JP | 2002-032434 | 1/2002 |
| JP | 2002-149804 | 5/2002 |
| JP | 2002-183251 | 6/2002 |

OTHER PUBLICATIONS

Operating manual for the QRS Keystone for Retailers (1996) by QRS Corporation, www.qrs.com, pp. 1-115.*

Scientific publication entitled "Smart Catalogs and Virtual Catalogs" by Keller, Computer Sci.Dept., Stanford University, 1995, pp. 1-11.*

Gary H Anthes. (Jun. 2004). Refurnishing THE Supply Chain. Computerworld, 38(23), 39-41.*

Blackhurst, Jennifer J. (2002). A network based methodology to model supply chain systems. Ph.D. dissertation, The University of Iowa, United States—Iowa.*

Xavier Martin, Will Mitchell, & Anand Swaminathan. (1995). Recreating and Extending Japanese Automobile Buyer-Supplier Links in North America. Strategic Management Journal (1986-1998), 16(8), 589.*

Iyengar, Deepak (2005). Effect of transaction cost and coordination mechanisms on the length of the supply chain. Ph.D. dissertation, University of Maryland, College Park, United States.*

Peter Kelle, & Pam Anders Miller. (1998). Transition to just-in-time purchasing Handling uncertain deliveries with vendor-purchaser cooperation. International Journal of Operations & Production Management, 18(1), 53-65.*

Corey D Landsom. (2000). The missing link. Production and Inventory Management Journal, 41(1), 66-71.*

English Translation of Korean Patent Application No. 10-2005-7009651: Notice of Final Rejection dated Jan. 19, 2010, 2 pages.

\* cited by examiner

| Identification Information (Commodity code) | Manufacturer Information d1 | | | Manufacturer Information d2 | | | Manufacturer Information d3 | | | Client Information d1 | Client Information d2 | Client Information d3 |
|---|---|---|---|---|---|---|---|---|---|---|---|---|
| | Lot Number ① | Manufacturer code ② | Manufacturing Plant code ③ | Production Line code ④ | ① | ② | ③ | ④ | ① | ② | ③ | ④ | (Client code, Day on which transaction has been effected) | (Client code, Day on which transaction has been effected) | (Client code, Day on which transaction has been effected) |

Fig. 3

COMMODITY CONTROL SYSTEM AND MEDIUM CONTAINING COMMODITY CONTROL DATA

CROSS-REFERENCE TO RELATED APPLICATIONS

This application is a U.S. National Stage application claiming priority to International Application No. PCT/WO2/12551, filed Nov. 29, 2002, the disclosure of which is incorporated herein by reference in its entirety.

TECHNICAL FIELD

The present invention relates to a commodity control system or the like, and more particularly, to a commodity control system or the like for controlling a manufacturing channel and a transaction channel of a commodity.

BACKGROUND ART

Generally in a large number of enterprises, lot numbers are assigned to products (commodities), to carry out quality control or the like of the products. The lot number is a number assigned to the quantity of a particular item manufactured during one manufacturing process. The lot number is quantitatively assigned depending on physical or chemical attributes (viscosity, pH, etc.). For example, a lot number is assigned to a part produced by one part producing process (manufacturing process).

In the prior art, however, each of the enterprises assigns a lot number independently. When the enterprises are consolidated by way of example, therefore, there has been an inconvenience that lot numbers must be integrated between the enterprises each time.

In the prior art, a lot number assigned to a product is not controlled by correlating with a purchaser of the product. Therefore, each of the enterprises cannot grasp a transaction channel of the product that has been sold. On the other hand, there has been an inconvenience that a purchaser (a client, etc.) of the product cannot also grasp a proper manufacturing channel of the product that has not been purchased yet, for example.

An object of the present invention is to provide a commodity control system for improving such disadvantages of the prior art and particularly, carrying out commodity quality control among a plurality of enterprises, and further controlling a proper commodity manufacturing process and distribution process, and to provide a medium having commodity control data recorded thereon.

DISCLOSURE OF INVENTION

In order to attain the above-mentioned object, in the present invention, a commodity control system comprises information storage means, communication means for communicating with an external device, and information processing means for controlling the operation of each of the means, the storage means storing for each of the commodities identification information for identifying the commodity as well as client information of a client who has acquired the commodity.

The processing means employs such a configuration as to a) correlate the identification information for identifying the commodity with the client information of the client who has acquired the commodity and receive the correlated information from a client terminal through the communication means, b) collate the received identification information with the identification information stored in the storage means, and c) specify, when the received identification information has been matched with the identification information stored in the storage means as a result of the collation, the commodity identified by the received identification information, and d) add the received client information to the storage means for each of the specified commodities.

Here, "commodity" relates to manufacturing and distribution, and includes raw materials, intermediate products, and so on in addition to a target product. Further, "commodity" also includes electronic value information such as electronic money.

"Intermediate product" means a product, in a case where the target product is manufactured by a lot of processes, in the intermediate process. "Identification information" is information that is unique for each commodity. Examples of the identification information include a commodity code and a commodity number. "Manufacturer information" includes information for specifying a manufacturer who has manufactured a commodity and a lot number in the manufacturer. "Information for specifying a manufacturer" includes information such as the name of a manufacturing plant in addition to the name of a manufacturer. Examples of "manufacturer" herein referred to include a dealer of raw materials, a producer who produces intermediate products (parts, etc.) using the raw materials, and an assembler who assembles the intermediate products to manufacture a target product. Examples of "client information" include information for specifying a client and information representing the day on which transaction has been effected at the client. Examples of the information for specifying the client include a client code and a client number. Examples of the "client" herein referred to include a dealer, a deliverer, a repairer, and a consumer (an owner).

According to the present invention, the identification information for identifying the commodity and the client information of the client who has acquired the commodity are correlated with each other by the processing means and are received from the client terminal through the communication means, the received identification information and the identification information stored in the storage means are collated with each other, and the commodity identified by the received identification information is specified when the received identification information has been matched with the identification information stored in the storage means as a result of the collation, and the client information received for each of the specified commodities is added to the storage means.

In order to attain the above-mentioned object, in the present invention, a commodity control system comprises information storage means, communication means for communicating with an external device, and information processing means for controlling the operation of each of the means, the storage means storing for each of commodities identification information for identifying the commodity and manufacturer information of a manufacturer who has manufactured the commodity.

The processing means employs such a configuration as to a) correlate the commodity identification information with the manufacturer information and receive the correlated information from a manufacturer terminal through the communication means, b) collate the received identification information with the identification information stored in the storage means, c) specify, when the received identification information has been matched with the identification information stored in the storage means as a result of the collation, the commodity identified by the received identification information, and d) add the received manufacturer information to the storage means for each of the specified commodities.

According to the present invention, the commodity identification information and the manufacturer information are correlated with each other by the processing means and are received from the manufacturer terminal through the communication means, the received identification information and the identification information stored in the storage means are collated with each other, and the commodity identified by the received identification information is specified when the received identification information has been matched with the identification information stored in the storage means as a result of the collation, and the manufacturer information received for each of the specified commodities is added to the storage means.

In order to attain the above-mentioned object, in the present invention, a commodity control system comprises information storage means, communication means for communicating with an external device, and information processing means for controlling the operation of each of the means, the storage means correlating identification information for identifying a commodity with manufacturer information of a manufacturer who has manufactured the commodity and storing the correlated information as well as correlating the identification information for identifying the commodity with client information of a client who has acquired the commodity and storing the correlated information.

The processing means employs such a configuration as to a) correlate the commodity identification information with the manufacturer information and receive the correlated information from a manufacturer terminal through the communication means, b) collate the received identification information with the identification information stored in the storage means, c) specify, when the received identification information has been matched with the identification information stored in the storage means as a result of the collation, the commodity identified by the received identification information, d) add the received manufacturer information to the storage means for each of the specified commodities, e) correlate the identification information for identifying the commodity with the client information of the client who has acquired the commodity and receiving the correlated information from a client terminal through the communication means, f) collate the received identification information with the identification information stored in the storage means, g) specify, when the received identification information has been matched with the identification information stored in the storage means as a result of the collation, the commodity identified by the received identification information, and h) add the received client information to the storage means for each of the specified commodities.

According to the present invention, the commodity identification information and the manufacturer information are correlated with each other by the processing means and are received from the manufacturer terminal through the communication means, the received identification information and the identification information stored in the storage means are collated with each other, and the commodity identified by the received identification information is specified when the received identification information has been matched with the identification information stored in the storage means as a result of the collation, and the manufacturer information received for each of the specified commodities is added to the storage means. The identification information for identifying the commodity and the client information of the client who has acquired the commodity are correlated with each other by the processing means and are received from the client terminal through the communication means, the received identification information and the identification information stored in the storage means are collated with each other, and the commodity identified by the received identification information is specified when the received identification information has been matched with the identification information stored in the storage means as a result of the collation, and the client information received for each of the specified commodities is added to the storage means.

According to the present invention, the processing means receives the commodity identification information or the manufacturer information from an information searcher terminal through the communication means, reads out the client information correlated with the received identification information or manufacturer information from the storage means, and transmits the read client information to the information searcher terminal.

Here, "information searcher" means all persons who retrieve information. Examples include a maker, a distributor, a deliverer, a repairer, and a consumer (an owner).

In the present invention, the processing means receives the client information from the information searcher terminal through the communication means, reads out from the storage means the identification information or/and manufacturer information correlated with the received client information, and transmits the read identification information or/and manufacturer information to the information searcher terminal.

In the present invention, the processing means receives the commodity identification information from the information searcher terminal through the communication means, reads out from the storage means the manufacturer information correlated with the received identification information, and transmits the read manufacturer information to the information searcher terminal.

In the present invention, the processing means receives the commodity manufacturer information from the information searcher terminal through the communication means, reads out from the storage means the identification information correlated with the received manufacturer information, and transmits the read identification information to the information searcher terminal.

In the present invention, the storage means stores the manufacturer information, including process information of manufacturing processes in the manufacturer, the processing means receives, when the received manufacturer information is added to the storage means for each of the specified commodities, the process information included in the manufacturer information from the manufacturer terminal through the communication means for each of the manufacturing processes, and also adds the process information included in the received manufacturer information to the storage means for each of the manufacturing processes.

Here, "process information" means information for specifying the manufacturing processes. Examples of the process information include a production line code and a production line number.

In the present invention, the identification information for identifying the commodity and the manufacturer information of the manufacturer who has manufactured the commodity are correlated with each other and recorded, and the identification information for identifying the commodity and the client information of the client who has acquired the commodity are also correlated with each other and recorded.

Herein presumed as "medium" are an IC card, a magnetic card, or an IC chip, for example. The medium is incorporated into and added to the commodity, thereby allowing a transaction process of the commodity to be confirmed, for example.

This attempts to attain the above-mentioned object.

BRIEF DESCRIPTION OF DRAWINGS

FIG. 3 is a diagram showing an example of the structure of commodity control data;

BEST MODE FOR CARRYING OUT THE INVENTION

An embodiment of the present invention will be described on the basis of FIGS. 1 to 5.

Figure 1:
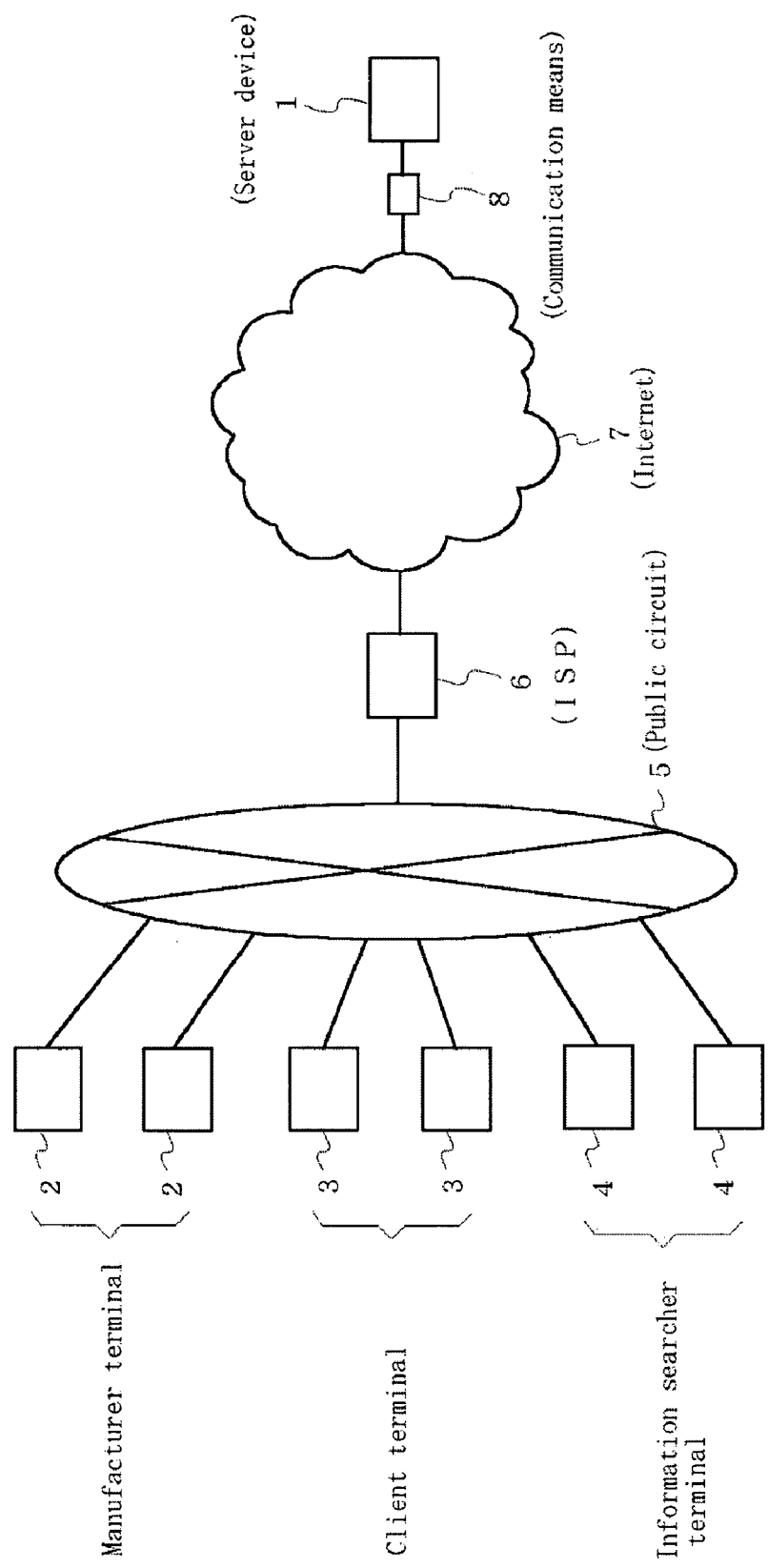
FIG. 1 is a diagram of the entire configuration of a system showing an embodiment of the present invention.

FIG. 1 is a diagram showing the entire configuration of a system.

In the system shown in FIG. 1, a manufacturer terminal 2, a client terminal 3, and an information searcher terminal 4 are respectively connected to an Internet service provider (ISP) 6 through a public circuit 5, and are connected to the Internet 7 from the ISP 6 through a dedicated line. A server device 1 is connected to the Internet 7 through communication means 8.

Here, an example of each of the manufacturer terminal 2, the client terminal 3, and the information searcher terminal 4 is a personal computer, a cellular phone, a bidirectional television, an information portable terminal, or a home game machine. Examples of "manufacturer" include a dealer of raw materials, a producer of parts, and an assembler of parts. Examples of "client" include a distributor, a deliverer, a repairer, and a consumer (an owner). Examples of "information searcher" also include a manufacturer and a client.

Each of the manufacturer terminal 2, the client terminal 3, and the information searcher terminal 4 can utilize the system by accessing a predetermined Web page provided by the server device 1.

The contents of the configuration of the server device 1 will be then specifically described.

Figure 2:
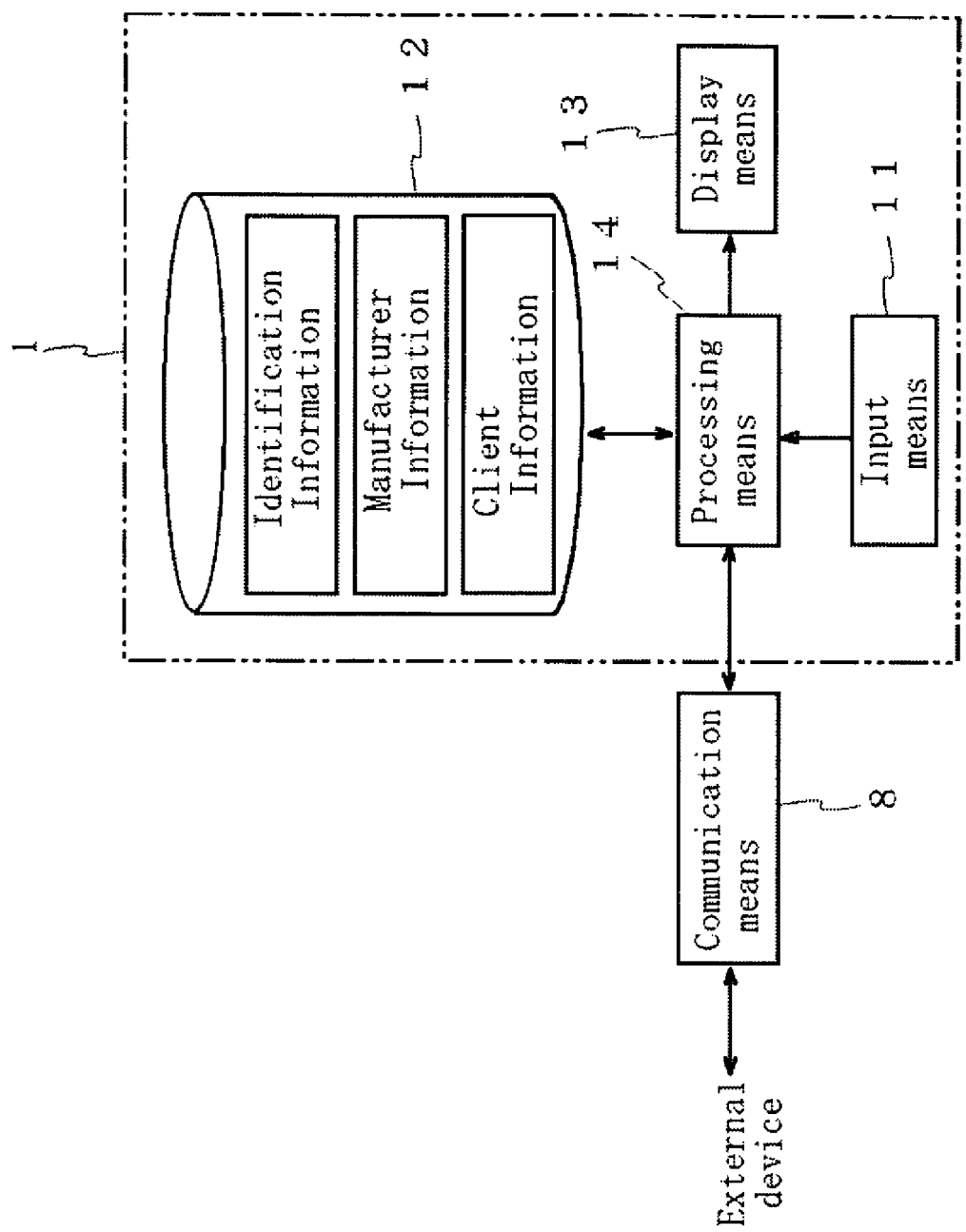
FIG. 2 is a diagram showing the configuration of a server device disclosed in FIG. 1.

FIG. 2 is a diagram showing the configuration of the server device 1.

The server device 1 shown in FIG. 2 comprises information input means 11, information storage means 12, information display means 13, communication means 8 for communicating with an external device, and information processing means 14 for controlling the operation of each of the means.

The storage means 12 correlates identification information for identifying a commodity with manufacturer information of a manufacturer who has manufactured the commodity and stores the correlated information, and correlates identification information for identifying the commodity with client information of a client who has acquired the commodity and stores the correlated information. The storage means 12 stores the manufacturer information, including process information of manufacturing processes in the manufacturer.

Here, the processing means 14 includes a CPU (Central Processing Unit) or the like for controlling the operation of the whole of the server device 1. The storage means 12 is a hard disk, for example. However, the processing means 14 is not limited to a case where it is composed of a single CPU. For example, the processing means 14 may include a plurality of computers for performing distributed processing. Further, it does not matter whether the number of the storage means 12 is physically singular or plural. The communication means 8 is a router, for example. The input means 11 is a keyboard, for example. The display means 13 is a computer display, for example.

An example of the structure of commodity control data stored in the storage means 12 will be then described on the basis of FIG. 3.

In FIG. 3, the commodity control data has "identification information (a commodity code)", "manufacturer information d1 to d3", and "client information d1 to d3" arranged therein in a row direction. Here, the sings d1 to d3 of the manufacturer information indicate the order of a manufacturing channel. In the present embodiment, the manufacturer information d1, the manufacturer information d2, and the manufacturer information d3 shall respectively indicate information representing a manufacturer (a dealer of raw materials, etc.) in a first process, information representing a manufacture (a producer of parts, etc.) in a second process, and information representing a manufacturer (an assembler of parts, etc.) in a third process.

The "manufacturer information d1" includes "lot number", "manufacturer code", "manufacturing plant code", and "production line code", as shown in FIG. 3. The same is true for "manufacturer information d2 and d3".

The signs d1 to d3 of the client information indicate the order of transaction processes. In the present embodiment, the client information d1, the client information d2, and the client information d3 respectively indicate information representing a first client (a distributor, etc.), information representing a second client (a deliverer, etc.), and consumer information of a third client (a customer).

"Client information d1" actually includes "client code" and "day on which transaction has been effected", as shown in FIG. 3. The same is true for "transaction information d2 and d3".

This will be specifically described.

"Identification information" is taken as a 4-byte variable length code. Further, "client information" is also taken as a 4-byte variable length code. That is, each of "identification information" and "client information" is "00000000" to "FFFFFFFF".

As "manufacturer information", "lot number", "manufacturer code", "manufacturing plant code", and "production line code" are respectively set for the 4-byte variable length code.

The first one byte in the above-mentioned 4-byte variable length code makes it possible to comprehend what meaning the code has. For example, setting is made such that the first one byte "01", "02, and "03" respectively indicate identification information for identifying a commodity, manufacturer information, and client information. Further, "04" is also set in the first one byte so as to cause the consumer information d3 out of the client information d1, d2, and d3 to have a meaning.

The maximum number of digits composing the commodity control data stored in the storage means 12 shall be previously set. Further, the formats of "identification information", "manufacturer information", and "client information" may be integrated in conformity to a standard such as EDIFACT.

In addition thereto, a known configuration required for a data structure is also provided as it is in the present embodiment.

Here, the commodity control data may be recorded on a computer readable medium. That is, the computer readable medium may be one on which identification information for identifying a commodity and manufacturer information of a manufacturer who has manufactured the commodity are correlated with each other and recorded, and the identification information for identifying the commodity and client information of a client who has acquired the commodity are also correlated with each to each other and recorded.

The foregoing will be further described in detail. First, description is made of a function for the server device 1 to register the manufacturer information. In the present embodiment, the processing means 14 correlates the commodity identification information with the manufacturer information and receives the correlated information from the manufacturer terminal 2 through the communication means.

The processing means 14 collates the received identification information with the identification information stored in the storage means 12, and specifies, when the received identification information has been matched with the identification information stored in the storage means as a result of the collation, the commodity identified by the received identification information.

The processing means 14 adds the manufacturer information received for each of the specified commodities to the storage means 12.

In this case, the processing means 14 may receive the process information included in the manufacturer information from the manufacturer terminal 2 through the communication means 8 for each of the manufacturing processes and also add the process information included in the received manufacturer information to the storage means 12 for each of manufacturing processes.

The processing means 14 correlates the identification information for identifying the commodity with the client information of the client who has acquired the commodity, and receives the correlated information from the client terminal 3 through the communication means 8.

The processing means 14 collates the received identification information with the identification information stored in the storage means 12, and specifies, when the received identification information has been matched with the identification information stored in the storage means 12 as a result of the collation, the commodity identified by the received identification information.

Furthermore, the processing means 14 adds the received client information to the storage means 12 for each of the specified commodities.

When the client information is consumer information of a new consumer (owner), which is not controlled in the storage means 12, the processing means 14 updates the consumer information, which is controlled in the storage means 12, to the new consumer information.

When the new consumer information received by the processing means 14 is updated, however, the processing means 14 provides the following transaction confirmation in order to ensure security, for example.

That is, the processing means 14 first transmits a message stating that the ownership of the commodity is changed to a new consumer terminal 3 that has provided new consumer information and a consumer terminal 3 that has provided the consumer information controlled in the storage means 12. The processing means 14 updates, when confirmation information indicating that the contents of the message are valid are respectively received from the new consumer terminal 3 and the consumer terminal 3, the received new consumer information in the storage means 12.

The searching function of the server device 1 will be then described.

The processing means 14 receives commodity identification information (or manufacturer information) from the information searcher terminal 4 through the communication means 8, reads out client information correlated with the received identification information (or manufacture information) from the storage means 12, and transmits the read client information to the information searcher terminal 4.

The processing means 14 receives the client information from the information searcher terminal 4 through the communication means 8, reads out the identification information (or/and manufacturer information) correlated with the received client information from the storage means 12, and transmits the read identification information (or/and manufacturer information) to the information searcher terminal 4.

The processing means 14 receives the commodity identification information from the information searcher terminal 4 through the communication means, reads out the manufacturer information correlated with the received identification information from the storage means 12, and transmits the read manufacturer information to the information searcher terminal 4.

Furthermore, the processing means 14 receives the commodity manufacturer information from the information searcher terminal 4 through the communication means 8, reads out the identification information correlated with the received manufacturer information from the storage means 12, and transmits the read identification information to the information searcher terminal 4.

In addition thereto, a known configuration required as the server device 1 on the Internet and its function are also provided as they are in the present embodiment.

Figure 4:
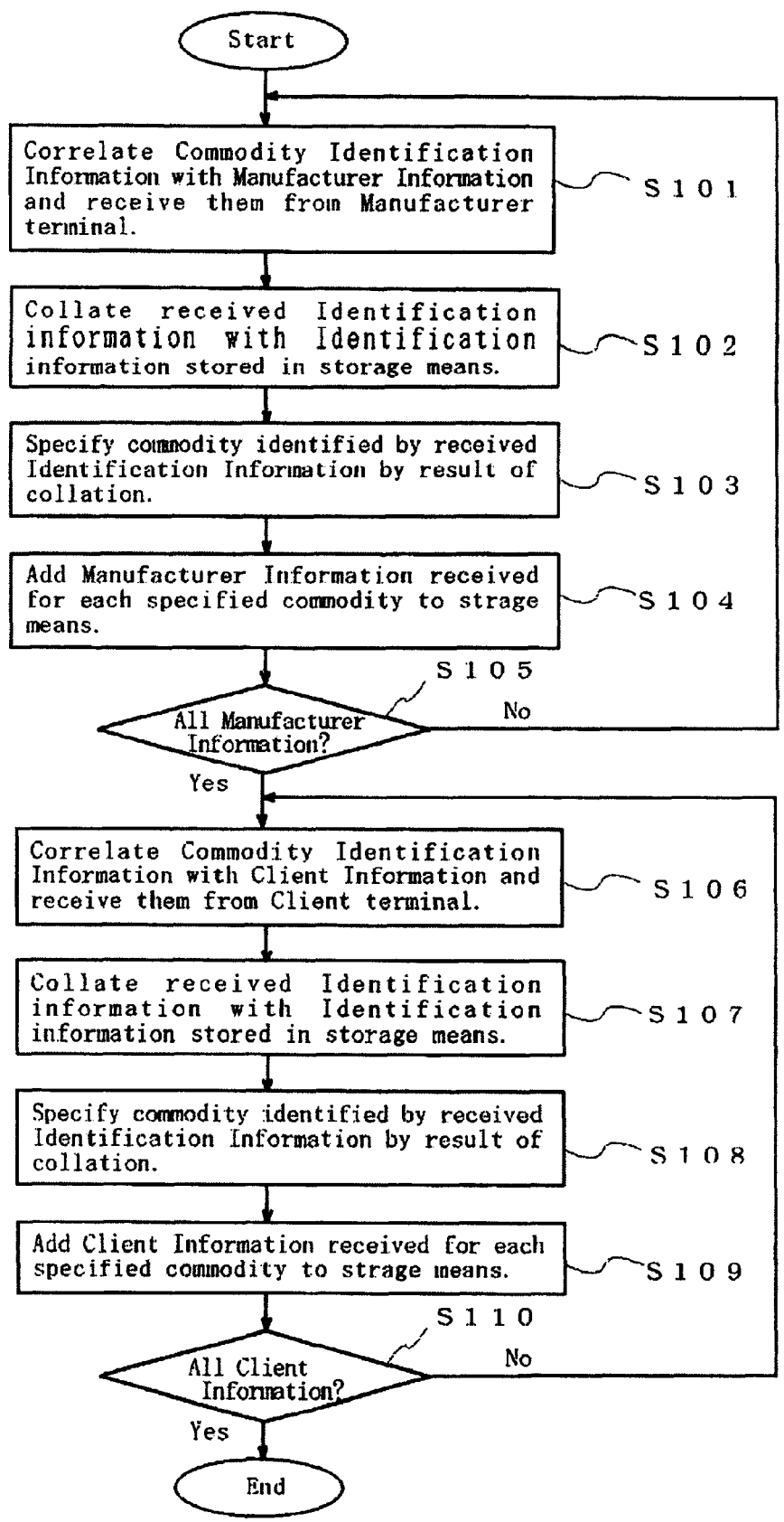
FIG. 4 is a flow chart showing the operation of a server device in a case where manufacturer information and client information are registered.

The operations of the present embodiment will be described on the basis of FIG. 4. Description is first made of the operations of the server device 1 in a case where the manufacturer information d1 to d3 and the client information d1 to d3 are registered.

First, the processing means 14 correlates the commodity identification information with the manufacturer information d1 including the process information, and receives the correlated information from the manufacturer terminal 2 through the communication means 8 (S101)

Subsequently, the processing means 14 collates the received identification information with identification information stored in the storage means 12 (S102), and specifies, when the received identification information has been matched with the identification information stored in the storage means 12 as a result of the collation, a commodity identified by the received identification information (S103).

The processing means 14 then adds to the storage means 12 the manufacturer information d1 including the manufacturing processes received for each of the specified commodities (S104).

Then, the processing means 14 also adds the manufacturer information d2 to d3 to the storage means 12 (S101 to S104) as a result of repeating the same operations as described above with respect to the manufacturer information d2 to d3 (S105).

The processing means 14 then correlates the identification information for identifying the commodity with the client information d1 of the client who has acquired the commodity, and receives the correlated information from the client terminal 3 through the communication means 8 (S106).

The processing means 14 then collates the received identification information with the identification information stored in the storage means 12 (S107), and specifies, when the received identification information has been matched with the identification information stored in the storage means as a result of the collation, the commodity identified by the received identification information (S108).

The processing means 14 then adds the client information d1 received for each of the specified commodities to the storage means 12 (S109).

The processing means 14 also adds the client information d2 to d3 to the storage means 12 (S106 to S109) as a result of repeating the same operations as mentioned above with respect to the client information d2 to d3 (S110).

Thereafter, the processing means 14 updates, when it receives consumer information of a new consumer (owner), which is not controlled in the storage means 12, the client (consumer) information d3, which is controlled in the storage means 12, to the new consumer information.

In this system, the manufacturer information d1 to d3 received from the manufacturer terminal 2 are thus added to the storage means 12 for each of the commodities identified by the identification information. Therefore, the manufacturer information d1 to d3 of all the manufacturers can be controlled for each of the commodities, thereby making it possible to control for each of the commodities a manufacturing channel of the commodity.

If the manufacturing channel of the commodity is a dealing process of raw materials (a first manufacturing process), a producing process for producing parts using the raw materials (a second manufacturing process), and an assembling process for assembling the parts to manufacture a target product (a third manufacturing process), dealer (manufacturer) information d1, producer (manufacturer) information d2, and assembler (manufacturer) information d3 are respectively added to the storage means 12, thereby allowing all valid manufacturers of the commodity to be reliably controlled.

The manufacturer information includes for each of the commodities a lot number, a manufacturing plant code, and a production line code (process information). Therefore, it is also possible to control for each of the commodities the information such as the lot number among enterprises so that the enterprises are integrated to carry out quality control of the commodities, for example.

Furthermore, the client information d1 to d3 received from the client terminal 3 are added to the storage means 12 for each of the commodities identified by the identification information. Therefore, all the clients who have transacted all the commodities can be controlled for each of the commodities, thereby allowing transaction channels (distribution processes) of all the commodities to be controlled for each of the commodities.

If the transaction channel of the commodity is a distributor (a first client), a deliverer (a second client), and a consumer (a third client), for example, distributor (client) information d1, deliverer (client) information d2, and consumer (owner) information d3 are respectively added to the storage means 12, thereby allowing all the valid clients of the commodity to be reliably controlled.

Moreover, the client information includes the consumer (owner) information d3. Therefore, the valid owner of the commodity after purchasing the commodity can be controlled, thereby making it possible to prevent an imitated product and a plagiarized product from flowing out by a third person.

Particularly in this system, the new consumer information is updated on the storage means 12. Therefore, the current owner of the commodity can be always controlled, thereby allowing imitation and plagiarization by a third person to be rapidly prevented.

Furthermore, according to this system, the manufacturer information d1 to d3 including the process information (production line codes) received from the manufacturer terminal 2 are added to the storage means 12 for each of the manufacturing processes. Therefore, it is possible to also control judgment which production line is used to manufacture the commodity for each of the manufacturing processes.

According to this system, the manufacturer information such as the lot number can be shared among unspecified enterprises. Even if the enterprises are consolidated, therefore, it is possible to save time and labor required to integrate the lot number or the like among the enterprises each time.

Furthermore, the commodity identification information and the client information can be shared among the unspecified enterprises. Therefore, it is possible to make use of the information as an integrated information source for grasping a proper manufacturer and client of the commodity by an information searcher, described later.

Figure 5:
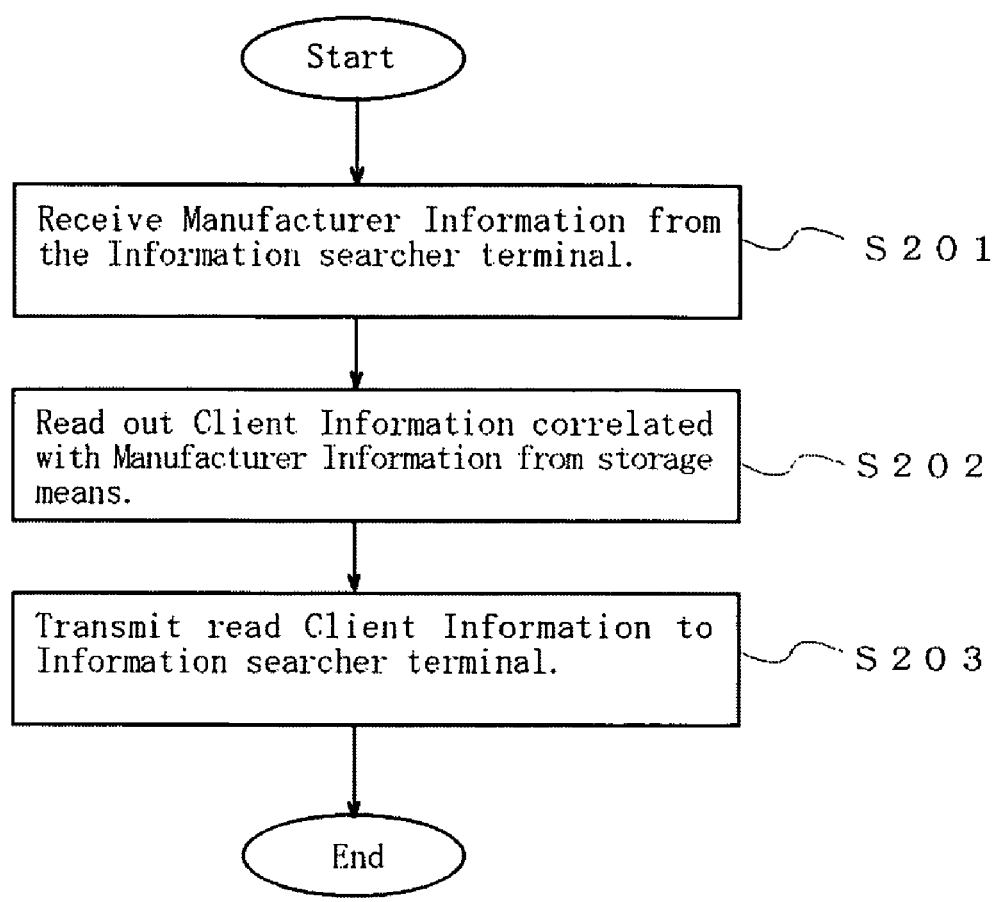
FIG. 5 is a flow chart showing the operation of a server device in a case where manufacturer information is received from an information searcher terminal.

The operations of the server device 1 in a case where the manufacturer information d1 is received from the information searcher terminal 4 will be then described on the basis of FIG. 5.

First, the processing means 14 receives the manufacturer information d1 from the information searcher terminal 4 through the communication means 8 (S201).

The processing means 14 then reads out from the storage means 12 the client information d1 to d3 correlated with the received manufacturer information d1 (S202).

The processing means 14 then transmits the read client information d1 to d3 to the information searcher terminal 4 (S203).

In this system, the client information d1 to d3 correlated with the manufacturer information d1 received from the information searcher terminal 4 are thus transmitted to the information searcher terminal 4. Therefore, an information searcher can acquire the client information d1 to d3 using the manufacturer information d1 as a search key as a result of the searching. Thus, the information searcher can grasp all clients who have acquired a commodity manufactured in a particular manufacturer, thereby allowing a transaction channel (a distribution channel) of the commodity manufactured in the particular manufacturer to be confirmed.

In this case, the information searcher can grasp a valid transactor of the commodity by acquiring the client information d1 to d3. Therefore, it is possible to specify that commodities sold, for example, from transactors other than the valid transactor are so-called plagiarized products or imitated products.

When a defective product or the like flows out to a transaction market, the information searcher (an assembler, etc.) acquires the client information d1 to d3 to grasp a transaction channel of the defective product or the like, thereby making it easy to specify a client (a deliverer, etc.) that has become a factor of outflow of the defective product or the like.

Furthermore, the information searcher can grasp a transaction period (a duration of use) of a commodity in a case where the commodity has been sold by acquiring the client information d1 to d3 to grasp the day on which the transaction of the commodity has been effected. Consequently, the proper cost, for example, of the commodity that has become a used product can be set depending on the transaction period, that is, can be made use of for proper transaction in a used product market.

The information searcher can acquire the history of the repairs of a commodity by acquiring client information to grasp a repairer of the commodity.

The information searcher can specify an owner of a commodity who has illegally dumped a product by acquiring the consumer information in the client information to grasp the owner.

Although in the present embodiment, a case where the manufacturer information is used as a search key was herein exemplified, identification information may be used.

In this case, according to this system, the client information d1 to d3 correlated with the identification information received from the information searcher terminal 4 are transmitted to the information searcher terminal 4, so that an information searcher (a dealer, etc.) can acquire the client information d1 to d3 using the identification information as a search key as a result of the searching. Therefore, the information searcher can grasp, out of the client information d1 to d3 of clients who have acquired a specific commodity, the consumer (client) information d3 of a consumer who has acquired the specific commodity, thereby allowing the taste of a particular consumer to be confirmed. Consequently, it is possible for the information searcher to sensitively cope with the taste of the particular consumer (sends a commodity guide, for example) to improve the satisfaction of the consumer and acquire a new customer. Particularly, the use of the system is useful because the relationship between all manufacturers and consumers becomes close.

Although in the present embodiment, a case where the manufacturer information is used as a search key was herein exemplified, the client information d1 may be used.

In this case, according to this system, the identification information and the manufacturer information d1 to d3 correlated with the client information d1 received from the information searcher terminal 4 are transmitted to the information searcher terminal 4, so that the information searcher can acquire the identification information and the manufacturer information d1 to d3 using the client information d1 as a search key as a result of the searching. Therefore, the information searcher can grasp the identification information for identifying a commodity acquired in a particular client and the manufacturer information d1 to d3, thereby allowing a manufacturing channel of the commodity acquired in the particular client to be confirmed.

When an inferior product, a defective product, or the like is found out in a client (a deliverer, etc.), for example, an information searcher (a deliverer, etc.) acquires manufacturer information d1 to d3 to grasp a manufacturing channel of the inferior product, the defective product, or the like, thereby making it easy to specify a manufacturer (an assembler, etc.) of the inferior product, the defective product, or the like.

Commodity identification information may be used as a search key. In this case, according to this system, the manufacturer information d1 to d3 correlated with the identification information received from the information searcher terminal 4 are transmitted to the information searcher terminal 4, so that the information searcher can acquire the manufacturer information d1 to d3 using the identification information as a search key as a result of the searching. Therefore, the information searcher can grasp all manufacturers who have manufactured a particular commodity, thereby allowing a manufacturing channel of the particular commodity to be confirmed.

Furthermore, the manufacturer information d1 may be used as a search key. In this case, according to this system, the identification information correlated with the manufacturer information d1 received from the information searcher terminal 4 is transmitted to the information searcher terminal 4, so that the information searcher can acquire the identification information using the manufacturer information d1 as a search key as a result of the searching. Therefore, the information searcher can grasp all commodities manufactured in a particular manufacturer.

For example, an information searcher (a manufacturer, etc.) can grasp only a product manufactured in a particular manufacturer by acquiring the identification information using the manufacturer information d1 as a search key, for example. When the commodity becomes an inferior product due to a defective production line or the like in the manufacturer, therefore, the commodity (inferior product) manufactured by the production line is specified, thereby making it possible to easily recall the commodity.

The present invention is not limited to the above-mentioned embodiment.

Although with respect to commodity control data, a case where "manufacturer information" and "client information" having the same "identification information" are arranged in order was illustrated, as shown in FIG. 3, in the present embodiment, data items having the same "identification information" need not be particularly arranged in order. For example, "manufacturer information" and "client information" having a plurality of "identification information" may be arranged in the order written. The maximum number of digits composing the commodity control data is not set. In the case, "identification information", "manufacturer information", and "client information" are arranged by being repeated the number of times of writing.

Although a case where the commodity control data is a 4-byte variable length code was illustrated, it may be not the 4-byte variable length code but a 2-byte variable length code. Further, it may be a fixed length code. Further, it may be represented as not a hexadecimal number but a decimal number.

Although in the present embodiment, the first one byte in the 4-byte variable length code allows comprehension what meaning the code has, a flag may be utilized.

The system may be one utilizing not the Internet but WAN (Wide-Area-Network). Further, not wired transmission but radio transmission may be utilized. A lot of manufacturer terminals 2, client terminals 3, and information searcher terminals 4 exist depending on the number of users.

In such a way, the same function and effect as those in FIG. 1, described above, can be also obtained.

Another Modified Example

Processing means 14 replaces, when it receives information indicating that identification information correlated with client information of its own is replaced with identification information correlated with another client information from a client terminal 3 through communication means 8, the identification information correlated with the client information of its own with the identification information correlated with the other client information on the basis of the information indicating that replacement is performed.

When the processing means 14 replaces the identification information, the identification information may be replaced when the processing means 14 transmits a message stating that commodities are replaced to the client terminal 3 that has provided the client information of its own and the client terminal 3 that has provided the other client information and respectively receives information indicating that the contents of the message are valid from the client terminal 3 of its own and the other client terminal 3.

Thus, clients (including consumers) can change the ownership of a commodity, thereby allowing the clients to barter on the Internet. Particularly when this system is made use of, commodities can be replaced without mediating money, thereby allowing transaction with foreign countries to be easily conducted.

Although description was made of a case where the client information includes a manufacturing plant code, a production line code, and so on, it may not include the manufacturing plant code, the production line code, and so on due to manufacturer's convenience.

Thus, the manufacturer can ensure data privacy according to its own convenience, which is useful particularly in the case of a highly secret project, for example.

The processing means 14 may correlate, when it is accessed from a user, identification information with manufacturer information and client information and control a log of the information in storage means 12.

Thus, a correspondence between a commodity and its manufacturer or client (including its consumer) can be reliably controlled, thereby making it possible to reliably impose the charge on the commodity that has been transacted on the Internet.

The processing means 14 may correlate identification information relating to information delivery (music, video, software, etc.) with client information and control a log of the information in the storage means 12.

Thus, a correspondence between the information delivery and the client can be reliably controlled, thereby making it possible to specify a person who has illegally made copies on the Internet. Consequently, the effect of restraining illegal copies via the Internet can be expected.

Communication may be established through peer-to-peer communication between consumer (client) terminals 3. For example, communication is established between the consumer terminals 3 by collating consumer information of a consumer with information (a request, etc.) that is required of another consumer.

This allows only a valid request having no deceit (a false name, etc.) to be reliably carried out among consumers.

The above-mentioned consumer terminal 3 can be also a personal terminal of a voter, a taxpayer, or the like. In this case, the above-mentioned consumer information such as a consumer number can be utilized in place of personal identification information such as a taxpayer number or a voter number. Specifically, the personal terminal 3 may correlate personal identification information such as a voter number or a taxpayer number of an individual with information relating to voting and information relating to tax payment and transmit the correlated information to a computer system in an external regulating authority. In this case, storage means in the computer system stores a voter number, a taxpayer number, etc. of an individual and each of items of attributes (a name, etc.) of the individual in a state where they are correlated with each other.

Thus, an individual can be specified by personal identification information, thereby making it possible for the individual to give a vote and pay a tax, for example anytime and anywhere.

INDUSTRIAL APPLICABILITY

The present invention is configured to function as described above. Therefore, all client information of clients who have transacted all commodities are added to storage means for each of the commodities, so that transaction channels of all the commodities can be controlled for each of the commodities.

All manufacturer information of manufacturers who have manufactured all commodities are added to storage means for each of the commodities, so that manufacturing channels of all the commodities can be controlled for each of the commodities.

All manufacturer information of manufacturers who have manufactured all commodities and all client information of clients who have transacted all the commodities are added to storage means for each of the commodities, so that manufacturing channels of all the commodities and transaction channels (distribution processes) of all the commodities can be controlled for each of the commodities.

Furthermore, client information using manufacturer information as a search key is transmitted to an information searcher terminal, so that an information searcher can grasp all clients who have transacted a commodity manufactured in a particular manufacturer, thereby allowing a transaction channel (a distribution process) of the commodity manufactured in the particular manufacturer to be confirmed in real time.

Client information using identification information as a search key is transmitted to an information searcher terminal, so that an information searcher can grasp, out of clients who have acquired a particular commodity, a consumer who has acquired the particular commodity, thereby allowing the taste of the particular consumer to be confirmed. Consequently, the information searcher provides commodities that the particular consumer has a high desire to acquire and services depending on his or her taste, thereby allowing a new customer to be acquired.

Furthermore, identification information (or/and manufacturer information) using client information as a search key is acquired as a result of searching, so that all commodities that have been transacted by a particular client (or/and manufacturers) can be grasped, thereby allowing all commodities that have been transacted by the particular client (or/and manufacturing channels) to be confirmed.

In addition thereto, manufacturer information using identification information as a search key is transmitted to an information searcher terminal, so that an information searcher can grasp all manufacturers who have manufactured a particular commodity, thereby allowing a manufacturing channel of the particular commodity to be confirmed in real time.

Identification information using manufacturer information of a manufacturer who has manufactured a commodity as a search key is transmitted to an information searcher terminal, thereby allowing all commodities that are manufactured in a particular manufacturer to be confirmed in real time.

The manufacturer information includes process information of manufacturing processes in the manufacturer, thereby making it possible to comprehend which of the manufacturing processes (production lines) is used to manufacture the commodity.

Furthermore, manufacturing channels of all commodities and transaction channels (distribution processes) of all commodities can be controlled for each of the commodities.

Thus, it is possible to provide a superior commodity control system, which is not provided in the prior art, capable of further controlling, while carrying out commodity quality control among a plurality of enterprisers, proper commodity manufacturing and distribution processes and a medium having commodity control data recorded thereon.

The invention claimed is:
1. A commodity control system comprising:
a computer processor;
information storage means configured to store a commodity control byte data for each of a plurality of commodities, the commodity control byte data comprising a com- modity identification information for identifying the commodity, manufacturer information associated with a plurality of manufacturers that have manufactured the commodity and client information associated with a plurality of clients that have acquired the commodity;

communication means for communicating with an external device; and information processing means for controlling the operation of each of the means, wherein the information processing means is configured to:

a) correlate commodity identification information with manufacturer information associated with one of the plurality of manufactures to receive correlated information from a manufacturer terminal through the communication means, b) collate the received commodity identification information with the commodity identification information stored in the storage means, c) specify, when the received commodity identification information has been matched with the commodity identification information stored in the storage means as a result of the collation, the commodity identified by the received identification information, d) extend, via the computer processor, in a linear fashion, the commodity control byte data associated with the specified commodity by adding the received manufacturer information to the commodity control byte data associated with the specified commodity and store the commodity control byte data to the storage means, e) correlate commodity identification information for identifying the commodity with client information associated with one of the plurality of clients to receive correlated information from a client terminal through the communication means, f) collate the received commodity identification information with the commodity identification information stored in the storage means, g) specify, when the received commodity identification information has been matched with the commodity identification information stored in the storage means as a result of the collation, the commodity identified by the received identification information, and h) extend, via the computer processor, in a linear fashion, the commodity control byte data associated with the specified commodity by adding the received client information to the commodity control byte data associated with the specified commodity and store the commodity control byte data to the storage means.

2. The commodity control system according to claim 1, characterized in that the processing means receives the commodity identification information or the manufacturer information from an information searcher terminal through the communication means, reads out the client information correlated with the received identification information or manufacturer information from the storage means, and transmits the read client information to the information searcher terminal.

3. The commodity control system according to claim 1, characterized in that the processing means receives the client information from the information searcher terminal through the communication means, reads out from the storage means the identification information or/and manufacturer information correlated with the received client information, and transmits the read identification information or/and manufacturer information to the information searcher terminal.

4. The commodity control system according to claim 1, characterized in that the processing means receives the commodity identification information from the information searcher terminal through the communication means, reads out from the storage means the manufacturer information correlated with the received identification information, and transmits the read manufacturer information to the information searcher terminal.

5. The commodity control system according to claim 1, characterized in that the processing means receives the commodity manufacturer identification information from the information searcher terminal through the communication means, reads out from the storage means the identification information correlated with the received manufacturer information, and transmits the read identification information to the information searcher terminal.

6. The commodity control system according to claim 1, wherein the storage means stores the manufacturer information, including process information of manufacturing processes in the manufacturer, the processing means receives, when the received manufacturer information is added to the storage means for each of the specified commodities, the process information included in the manufacturer information from the manufacturer terminal through the communication means for each of the manufacturing processes, and also adds the process information included in the received manufacturer information to the storage means for each of the manufacturing processes.

7. The method commodity control according to claim 1, wherein the commodity control byte data is extended such that data in the commodity control byte data is arranged in a row direction, the commodity control byte data comprises a first portion identifying the manufacturer information, and a second portion adjacent to the first portion in a row direction identifying the client information, and the commodity control byte data is extended such that the arrangement of data indicates an order of a manufacturing channel in a row direction and an order of transaction processes in a row direction.

8. The method commodity control according to claim 7, wherein the commodity control byte data is extended such that manufacturer information associated with a first manufacturer of the plurality of the manufacturers is arranged adjacent, in a row direction, to a second manufacturer of the plurality of the manufacturers.

9. The method commodity control according to claim 7, wherein the commodity control byte data is extended such that client information associated with a first client of the plurality of the clients is arranged adjacent, in a row direction, to a second client of the plurality of the clients.

10. The method commodity control according to claim 1, wherein the plurality of commodities comprises raw materials and the plurality of manufactures comprise a dealer of raw materials.

11. A computer-implemented method for controlling commodity, the method comprising:

correlating, a commodity identification information for identifying a commodity with a manufacturer information associated with one of a plurality of manufactures that have manufactured the commodity to receive a correlated identification information from a manufacturer terminal through a communication means;

collating the received commodity identification information with commodity identification information stored in a storage means;

specifying, when the received commodity identification information has been matched with a commodity identification information stored in the storage means as a result of the collation, the commodity identified by the received identification information;

extending, via the computer processor, in a linear fashion, a commodity control byte data associated with the specified commodity by adding the received manufacturer information to the commodity control byte data associated with the specified commodity and store the commodity control byte data to the storage means;

correlating the commodity identification information with client information associated with one of a plurality of clients that have acquired the commodity to receive the correlated information from a client terminal through the communication means;

collating the received commodity identification information with the commodity identification information stored in the storage means;

specifying, when the received commodity identification information has been matched with the commodity identification information stored in the storage means as a result of the collation, the commodity identified by the received identification information; and extending, via the computer processor, in a linear fashion, the commodity control byte data associated with the specified commodity by adding the received client information to the commodity control byte data associated with the specified commodity and store the commodity control byte data to the storage means.

* * * * *